3,506,454
PROCESS FOR PRODUCING PUFFED DOUGH PIECES

Stanley H. Reesman, Battle Creek, Mich., assignor to General Foods Corporation, White Plains, N.Y., a corporation of Delaware
No Drawing. Filed Aug. 18, 1966, Ser. No. 573,221
Int. Cl. A23l 1/10
U.S. Cl. 99—81                                                6 Claims

ABSTRACT OF THE DISCLOSURE

Puffed dough pieces are prepared by cooking a starch-containing dough, shaping the dough into pieces, partially drying the dough pieces to below 10% moisture under slow evaporation conditions, and then rapidly evaporating the remaining moisture and thereby puff the product to more than 3 times its volume in the partially dried state.

---

This invention relates to a novel puffed starch containing dough process and product.

Heretofore workers have endeavored to oven- or gun-puff cereal dough masses that have been shaped to a desirable outline such as an alphabet character or a number, and have then subjected the dough mass to the influences of rapid evaporation of moisture through such puffing techniques. Substantially gelatinized or cooked dough masses so-treated fail to retain the desired shape definition intended, and instead respond non-uniformly to the influences of such puffing. The best known process to achieve faithful expansion of a specially shaped starch-containing dough mass avoids cooking the shaped dough to any significant extent prior to charging the dough shape to a zone wherein the moisture thereof is rapidly evaporated in a "gun" to cause puffing. This finding has been the subject of United States Patents 2,954,295 and 2,954,296 to Clausi et al., issued Sept. 27, 1960, entitled "Process for Preparing Puffed Cereal Product." Certain ready-to-eat breakfast cereal forms in an O or "doughnut" shape can be substantially cooked and then charged to a gun-puffing operation, and will retain to a degree the shape definition after puffing that was originally intended; but when more complicated shapes are attempted by such processes, the identity of the outline of the dough piece or any perforation therein is substantially lost.

Nevertheless, it is desirable to provide a ready-to-eat breakfast cereal product or a snack item generally which has the flavor and crisp texture and low density of a gun-puffed cooked cereal dough, yet which retains shape definition whereby such complicated shapes as honeycombs, grids, stars, animals, numerals, flowers, birds, fish, etc. are afforded after puffing. The present invention accomplishes this object by following the process steps of forming a substantially gelatinized dough mass having starch as a major constituent of its solids content to the shape intended, drying the shaped dough mass under conditions wherein the moisture which initially evaporates from within the shaped dough mass diffuses therethrough from the interior at a rate substantially equal to the rate at which the moisture content is evaporated from the product surface, continuing drying from the surface until said moisture content has been reduced to a level less than about 10% and the interior of the semi-dried piece has a random arrangement of non-communicating voids not grossly viewable to the unaided eye, and thereafter subjecting the semi-dry shaped dough mass to the drying influences of a gaseous heat transfer medium of at least 350° F., such as a hot dry fluidizing gas wherein a majority of the moisture content remaining is rapidly evaporated and the pieces are puffed and toasted to the desired degree.

Partially dried dough shapes preparatory to puffing will generally be characterized by a glassy, horny, vitreous surface appearance. The semi-dried pre-puffed intermediate product will generally have undergone a limited degree of shrinkage from the size that it originally had prior to such partial drying but generally this shrinkage will not exceed 15% of the least major dimension of cooked dough shape prior to drying; more commonly the piece will not have shrunk to the extent of a reduction in excess of 10% of the least major dimension of the dough shape prior to drying. The interior of the piece will be uniform throughout the cross-section thereof when examined without a microscope. When examined microscopically, the surface of this semi-dried piece will be quite uniform and even and not interrupted by any pockets, perforations or fractures. Also, when viewed microscopically, the interior of the piece will have a plurality of small non-communicating voids or vesicles which are not viewable to the unaided eye.

Preferably, the cooked dough shape is subjected to a high humidity, moderately elevated temperature as will be described hereinafter to achieve a moisture reduction to the aforestated range of less than 10%, which moisture reduction is relatively slow as distinguished from prior practices which have called for the rapid dehydration of dough pieces preparatory to puffing. As distinguished from prior art, the dough pieces are not "case hardened," that is, the exteriors of the cooked dough shapes are not dried to form a relatively hard outer shell with an interior in a soft, plastic condition; rather, the semi-dried shaped dough piece resulting from the drying operation of the present invention is characterized by a uniform moisture reduction throughout the cross section of the dough shape and a uniform consistency.

The immediately foregoing high humidity, moderately elevated temperature drying may be obtained in any conventional convection drier wherein a drying gaseous atmosphere is circulated around the dough piece and thereby causes evaporation; generally such convection heating will not give rise to a temperature on the surface of the dough piece in excess of 200° F. and more typically the temperature of the dough piece during such drying will range anywhere from ambient conditions, say 70° F. and above to 180° F. depending upon the rate at which the gaseous atmosphere is circulated with respect to the dough piece.

Hence, the invention is not to be restricted in scope to high humidity convection drying technique, although it is preferred, for other means which cause water vapor to be removed efficaciously from the dough piece without case hardening thereof have been found to serve to like advantage. Specifically, electromagnetic energy sources in the radiowave range, such as embodied in dielectric and microwave heating devices, have been found to serve the function of elevating product moisture temperature in the interior of the dough piece and thereby inducing vaporization under the conditions specified herein, to-wit, water vapor transfer at a substantially uniform rate from the interior to the exterior of the dough piece. For the purpose of this invention, the radiowave range will be understood to include at least 1 megacycle and higher, typically 1-150 megacycles for dielectric heating and in excess of 900 to as high as 5,000 megacycles for microwave heating. High humidity, high temperature drying, however, does produce a more consistently puffable dough shape conforming to the shape originally induced.

After such drying, the semi-dried pregelatinized dough shape is preferably puffed in a high velocity, high temperature fluidized bed drier, wherein heated air at a temperature of at least 350° F., or preferably 400° to 550° F., is circulated at a high velocity, say 100 to 1,000 feet per minute, typically 900 feet per minute, through the bed to cause a rapid heat transfer whereby the residual moisture of the semi-dried dough piece is reduced to an extent just short of the point at which the product will scorch undesirably, and usually in a period less than one minute, more commonly in a period of 8 to 30 seconds, until a product moisture in the neighborhood of less than 5% and typically less than 3% is achieved. As a result, rapid evaporation of moisture in the dough piece occurs throughout and the gelatinous character thereof is caused to expand into a uniform vesicular texture which consistently retains the original shape of the dough piece. Usually, the semi-dried dough piece will puff to a bulk volume of at least 3 and commonly in the neighborhood of 5 times its original size prior to puffing.

Any variety of starch dough can be formulated and be of use in accordance with the present invention, such as dough starches of the tuber or cereal type, although the cereal type is preferred. Thus, cereal doughs such as corn, wheat, rice and the like can be cooked to a substantially gelatinized condition, having a moisture content of about 35%, the maximum moisture being a function of the desired extrusion consistency of the dough mass; too high an increase in moisture content above 35% affects the handling properties of the dough and will not lend same to sharp shape definition but will simply call for an increase in the level of moisture removal required to achieve the requisite semi-dry dough shapes. There is no practical lower moisture limit for cooking either type, moisture generally being in excess of 25%, depending upon the type of starch and its gelatinization characteristics. Frequently, it will be desirable to employ mixtures of cereal and tuber type starches, and indeed in many applications the use in minor amounts of a tuber starch as an adjunct to the cereal starch will be employed for the purpose of assuring more complete puffing of a more difficultly puffed cereal flour, such as oat. For ready-to-eat breakfast cereals, it would be preferred to employ a cereal flour in a predominant if not complete level for desirable flavor as well as texture.

The dough can be shaped to any desirable form, as will occur to those skilled in the art; conventional macaroni-forming and like equipment can be employed to give appropriate shape definition, particularly when desiring the more intricate shapes wherein shape definition represents a limitation of present-day puffing technology. Thus, unlimited designs and shapes, including multiple colors and textures, can be processed by the method of the present invention.

After such shaping and subdivision as may be dictated by shaping to achieve the form desired, the gelatinized dough piece will be subjected to the critical influence required in effecting the densified, uniformly dehydrated state described hereinabove. Although it is preferred to employ high humidity, moderate temperature drying conditions wherein air at a temperature typically of 120° to 160° F. having a relative humidity of at least 60% concomitant with achieving a slow even drying over an elapsed period at least 100 minutes and preferably in the neighborhood of 3 hours, lower temperatures and humidities and more prolonged drying periods may be employed or higher temperatures and humidities, provided the drying rate is such that the moisture is removed at a rate where case hardening at the surface thereof is avoided and the characterizing surface and interior described above are obtained. In this way, substantial differential drying rates between the surface portions of the dough shape and the interior of the dough shape are minimized. The most common type of drying equipment that may be employed to achieve this result are common macaroni- and similar pasta-drying equipment for low-temperature, high-humidity, long-term drying of raw pasta goods.

After such drying to produce the semi-dry dough shape, it is essential to achieve the desired puffing that the piece be charged to a medium wherein rapid heat transfer is effected so as to cause the balance of the water vapor to evaporate until at least a majority of the water remaining therein has been removed in a comparatively short period of time, generally less than 30 seconds from the piece and more commonly in the neighborhood of 10–20 seconds. The moisture content of the dough shape will be reduced as a result of such rapid evaporation to a moisture content less than 5% and more commonly in the neighborhood of about 3%. This is achieved preferably in a hot, dry, fluidizing, gaseous atmosphere such as air or an inert gas such as nitrogen. By employing a drying gas such as air at a temperature of at least 350° F. and more typically 400°–550° F., rapid heat transfer is effected particularly when said gaseous medium is caused to move across the dough shape at such a rate as to suspend the same therein, thereby maximizing heat transfer thereto and affording rapid evaporation of moisture therefrom.

The invention will now be more fully described by reference to the accompanying examples of typical operating conditions.

EXAMPLE I

Formula

|  | Percent as is |
| --- | --- |
| Corn flour | 79.70 |
| Salt | 3.98 |
| Certified color | .03 |
| Water | 16.29 |

Salt and color were dissolved in the water and the solution was combined with the corn flour in a Hobart mixer to form a loose dough having a moisture content of about 25%. The mixed material was then cooked in a rotary cooker for 22 minutes at 20 p.s.i.g. steam pressure. After cooking, the moisture was approximately 31%. The cooked material was cooled until a moisture of 29% was reached after which it was extruded into a curl shape using a macaroni extruder. The curls were 0.50" thick in their least dimension. After extrusion, the shaped dough was dried on trays for 24 hours at a room temperature of about 75° F. and a relative humidity of 35–40% to a moisture content of 9%.

The semi-dried shaped dough was then puffed in a fluidized bed type oven for 16 seconds using an air temperature of 525°–550° F. together with an air velocity of approximately 1,000 feet per minute. Puffing resulted in an expansion to a volume of approximately 3½ times that of the original semi-dried shaped dough and a reduction in moisture from 9% to about 2%, the shape being expanded to a resemblance of its original curled configuration.

EXAMPLE II

Formula

|  | Percent as is |
| --- | --- |
| Graham cracker flour | 51.70 |
| Straight grade unbleached wheat flour | 35.12 |
| Molasses | 6.59 |
| Sugar | 4.39 |
| Salt | 2.20 |
| Water (sufficient to make a 26% dough). | |

The flours were mixed in a paddle or ribbon mixer. The molasses, sugar, salt and water were combined to form a uniform syrup which was then added to the flour mixture and mixed to form a free-flowing dough. This dough was cooked for 35 minutes in an autoclave at 17 p.s.i.g. to a moisture content of 30–35% and then cooled to ambient room temperature. After cooling, the dough had a moisture content of 26–30% and was extruded in the shape of a grid composed of intersecting bars with square perforations therebetween, the extrudate being cut into pellets 0.090" to 0.125" thick. These pellets were then air dried under ambient room temperature (70° F., 45% R.H.) conditions until they had a moisture content of 8%. The pieces were then introduced to a high temperature, a high air velocity fluidized bed drying oven wherein air was circulated at 800 feet per second through the bed, the air being at a temperature of 430° F. prior to entry to the bed. This product puffed to a desired degree in 15 seconds, whence it was removed from the fluidized bed drier and cooled. The dried product had a moisture content of about 3%.

EXAMPLE III

Formula

| | Percent as is |
|---|---|
| Corn flour | 81.85 |
| Tapioca flour | 9.09 |
| Molasses | 3.38 |
| Sugar | 2.84 |
| Salt | 2.84 |

Water for 30% dough.

The flours were mixed in a paddle or ribbon mixer. The molasses, sugar, salt and water were combined to form a uniform syrup which was then added to the flour mixture and mixed to form a free-flowing dough. This dough was cooked for 35 minutes in an autoclave at 17 p.s.i.g. to a moisture content of 30–35% and then cooled. The cooked dough was then cooled to ambient room temperature. After cooling, the dough had a moisture content of 29–31% and was extruded in the shape of a six-pointed star with a center hole, the hole having a diameter of such size that the dough mass surrounding it was of equal thickness, the extrudate being cut into pellets 0.100″ to 0.110″ thick. The thus prepared star-shaped pellets were introduced to a forced circulating hot air oven having a relative humidity of 60% in the first zone thereof, air being introduced thereto at a dry bulb temperature of 150° F. for one hour and being thereafter introduced, following the removal of approximately 50% of the original moisture content of the dough, to air having a dry bulb temperature of 150° F. and a relative humidity of 20% for a period of one hour until the dough shapes were dried to a moisture content of 7–9%.

Thereafter the semi-dried star shapes having the character aforedescribed in the body of the specification were charged to a high temperature, high air velocity fluidized bed oven operating with an inlet air temperature of 430° F. and a circulating air velocity of 800 feet per second, the star shapes being puffed to at least thrice their original volume just prior to being charged to the drier in a period of approximately 22 seconds. Thereafter the puffed dough pieces were cooled and packaged at a moisture content of about 3%. As in the case of the grid of prior Example II, the star shape retained its identity as such.

EXAMPLE IV

Formula

| | Percent as is |
|---|---|
| Graham flour | 40.87 |
| Straight grade unbleached flour | 27.83 |
| Molasses | 6.96 |
| Sugar | 1.74 |
| Salt | 1.74 |
| Water | 20.86 |

The flours were mixed in a Hobart-type mixer; the molasses, sugar and salt were added to the water to form a solution and the solution was blended with the flour to form a free-flowing dough. The dough was cooked for 35 minutes at 17 p.s.i.g. and then cooled. The cooled dough had about 28% moisture. The cooled dough was extruded and cut into honeycombed shaped pellets 0.090″ to 0.125″ thick. The pellets were then dried in a microwave oven for 24 minutes at a frequency of 915 megacycles per second with a power input of 1.17 kilowatts. Air temperature within the chamber of the microwave drier was 150° F. The pellets were dried in the microwave chamber to a moisture content of 9.7% in 28 minutes. After microwave drying, the pellets were puffed in a fluidized bed-type oven at an air temperature of approximately 430° F. and 800 feet per minute air velocity for 15 seconds. The honeycomb shape puffed to 3½ times its original volume and retained its identity as such.

Although this invention has been described with reference to specific examples, it will be obvious to those skilled-in-the-art that various modifications may be made thereto which come within the scope of this invention.

What is claimed is:

1. A process for producing puffed dough pieces having a desirable shape which comprises:
   (a) cooking a starch-containing dough having at least 25% moisture,
   (b) shaping said dough into individual pieces,
   (c) partially drying said dough pieces at a product temperature of about 70° to 200° F. and a relative humidity of at least 35% for a period of time sufficient to reduce the moisture content to a level of less than 10%, and
   (d) puff-drying said partially pieces to about three times their volume, at the rapid drying temperatures of about 350° F. to thereby reduce the moisture content of said pieces to below 5% in a period of less than 60 seconds while retaining substantially the original dough piece shape in the expanded form.

2. The process according to claim 1 wherein the dough pieces are partially dried in a humid atmosphere at a temperature of 120° to 160° F. and a relative humidity of at least 60%.

3. The process of claim 1 wherein the dough pieces are partially dried under ambient conditions over a period of about 24 hours at a relative humidity of about 35 to 40%.

4. The process of claim 1 wherein the dough pieces are partially dried by electromagnetic energy at a frequency range of about 1–150 megacycles per second.

5. The process of claim 1 wherein the dough pieces are partially dried by electromagnetic energy at a frequency range of between 900–5,000 megacycles per second.

6. The process of claim 1 wherein the partially dried pieces are puffed in a hot fluidized, gaseous atmosphere at a temperature of 400° to 500° F., an air velocity of 100 to 1,000 feet per minute and a time period of 8 to 30 seconds to thereby reach a product moisture of at least 3%.

References Cited

UNITED STATES PATENTS

| 2,552,290 | 5/1951 | Lilly et al. | 99—81 |
| 2,922,355 | 1/1960 | Green | 99—81 XR |
| 2,954,295 | 9/1960 | Clausi et al. | 99—82 |
| 2,954,296 | 9/1960 | Clausi et al. | 99—82 |
| 3,077,406 | 2/1963 | Benson | 99—81 |

RAYMOND N. JONES, Primary Examiner

U.S. Cl. X.R.

99—83